(12) United States Patent
Kim et al.

(10) Patent No.: US 8,995,501 B2
(45) Date of Patent: Mar. 31, 2015

(54) METHOD AND APPARATUS OF PHYSICAL LAYER NETWORK CODING

(75) Inventors: Kwang Taik Kim, Yongin-si (KR); Vahid Tarokh, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 13/397,842

(22) Filed: Feb. 16, 2012

(65) Prior Publication Data

US 2012/0207193 A1 Aug. 16, 2012

Related U.S. Application Data

(60) Provisional application No. 61/443,290, filed on Feb. 16, 2011.

(30) Foreign Application Priority Data

Feb. 16, 2011 (KR) .................. 10-2011-0013553
May 4, 2011 (KR) .................. 10-2011-0042565

(51) Int. Cl.
*H04B 3/36* (2006.01)
*H04B 7/17* (2006.01)
*H04B 17/02* (2006.01)
*H04L 25/20* (2006.01)
*H04L 25/52* (2006.01)
*H04L 1/00* (2006.01)

(52) U.S. Cl.
CPC ............ *H04L 1/0045* (2013.01); *H04L 1/0041* (2013.01); *H04L 2001/0097* (2013.01)

USPC ............................................. 375/211

(58) Field of Classification Search
USPC ............................................. 375/211
See application file for complete search history.

(56) References Cited

U.S. PATENT DOCUMENTS

| 7,107,498 | B1 | 9/2006 | Schmidt et al. | |
| 2008/0244364 | A1* | 10/2008 | Shieh et al. ................. | 714/784 |
| 2009/0270028 | A1* | 10/2009 | Khojastepour et al. ......... | 455/24 |
| 2010/0246474 | A1* | 9/2010 | Zhang et al. ................. | 370/315 |
| 2010/0260240 | A1* | 10/2010 | Wang ........................... | 375/214 |
| 2010/0329227 | A1 | 12/2010 | Argyriou | |
| 2011/0096722 | A1* | 4/2011 | Jung .............................. | 370/328 |

FOREIGN PATENT DOCUMENTS

| KR | 10-2006-0133928 A | 12/2006 |
| KR | 10-2009-0063040 A | 6/2009 |
| KR | 10-2010-0060435 A | 6/2010 |

* cited by examiner

*Primary Examiner* — Tanmay Shah
(74) *Attorney, Agent, or Firm* — NSIP Law

(57) ABSTRACT

Provided is a physical layer network coding method and apparatus. A relay node determines reliabilities of symbols of nodes, based on a signal received from the plurality of nodes, and generates a transmission signal that maintains reliabilities of symbols that have high reliabilities and excludes components of symbols that have low reliabilities. The relay node generates the transmission signal that reduces an expected power of error, based on the received signal.

21 Claims, 9 Drawing Sheets

Comparison of Conventional and New PHY Network Coding Schemes

METHOD AND APPARATUS OF PHYSICAL LAYER NETWORK CODING

CROSS-REFERENCE TO RELATED APPLICATION(S)

This application claims the benefit under 35 U.S.C. §119 (e) of U.S. Provisional Application No. 61/443,290, filed on Feb. 16, 2011, in the U.S. Patent and Trademark Office, and the benefit under 35 U.S.C. §119(a) of Korean Patent Application No. 10-2011-0013553 filed on Feb. 16, 2011, and Korean Patent Application No. 10-2011-0042565 filed on May 4, 2011, in the Korean Intellectual Property Office, the entire disclosures of which are incorporated herein by reference.

BACKGROUND

1. Field

The following description relates to a physical layer network coding method and apparatus for correcting errors that are generated in a network.

2. Description of Related Art

Information that is transmitted over a communication network may be coded. For example, a network coding scheme is a scheme in which coding of information is performed in intermediate nodes, as well as in a source and at a destination. A general communication network transfers, to the destination, a payload of a packet that is generated at the source without changing the payload of the packet at a router. Conversely, a communication network using the network coding scheme may allow changing of the payload, such as changing by mixing different packets at a router.

Originally, the network coding scheme was suggested to improve a multi-cast throughput in a wired network. Currently, the use of a network coding scheme that provides tangible effects in a wireless network has drawn attention.

SUMMARY

In one general aspect, there is provided a communication method of a relay node, the method including receiving a signal including a first symbol through a $k^{th}$ symbol that are transmitted from a first node through a $k^{th}$ node, respectively, calculating, based on a predetermined criterion, a reliability of the first symbol through the $k^{th}$ symbol, respectively, selecting one or more symbols from among the first through the $k^{th}$ symbol that have a reliability that is greater than or equal to the predetermined criterion, and generating a transmission signal that maintains the reliabilities of the selected symbols and that excludes components of symbols that have reliabilities which are less than the predetermined criterion.

The generating may comprise generating the transmission signal to decrease an expected power of error between the transmission signal and the received signal.

The calculating may comprise calculating the reliabilities of the first symbol through the $k^{th}$ symbol, based on a log likelihood ratio (LLR) with respect to the first symbol through the $k^{th}$ symbol, respectively, each LLR calculated based on the received signal and channel information that is associated with the first node through the $k^{th}$ node, respectively.

The generating may comprise generating the transmission signal in which LLRs of the selected symbols are equivalent to LLRs of the selected symbols in the received signal or are within a predetermined range.

The equivalence or the difference in the predetermined range may be determined based on the Kuliback-Leibler distance.

The method may further comprise estimating channels with respect to the first node through the $k^{th}$ node based on pilots that are transmitted from the first node through the $k^{th}$ node, respectively.

The method may further comprise transmitting the transmission signal to a first destination node through a $k^{th}$ destination node corresponding to the first node through the $k^{th}$ node, respectively.

The transmitting may comprise transmitting the transmission signal by scaling the transmission signal, based on a predetermined transmission power.

The method may further comprise transmitting identification information that is associated with nodes corresponding to the selected symbols.

In another aspect, there is provided a computer-readable storage medium having stored therein program instructions to cause a processor to implement a communication method of a relay node, the method including receiving a signal including a first symbol through a $k^{th}$ symbol that are transmitted from a first node through a $k^{th}$ node, respectively, calculating, based on a predetermined criterion, a reliability of the first symbol through the $k^{th}$ symbol, respectively, selecting one or more symbols from among the first through the $k^{th}$ symbol that have a reliability that is greater than or equal to the predetermined criterion, and generating a transmission signal that maintains the reliabilities of the selected symbols and that excludes components of symbols that have reliabilities which are less than the predetermined criterion.

In another aspect, there is provided a relay node including a receiving unit to receive a signal including a first symbol through a $k^{th}$ symbol that are transmitted from a first node through a $k^{th}$ node, respectively, and a processing unit to calculate, based on a predetermined criterion, reliabilities of the first symbol through the $k^{th}$ symbol, respectively, wherein the processing unit selects one or more symbols that have a reliability that is greater than or equal to the predetermined criterion from among the first symbol through the $k^{th}$ symbol, and generates a transmission signal that maintains the reliabilities of the selected symbols and that excludes components of symbols that have reliabilities which are less than the predetermined criterion.

The processing unit may generate the transmission signal to decrease an expected power of error between the transmission signal and the received signal.

The processing unit may calculate the reliabilities of the first symbol through the $k^{th}$ symbol, based on log likelihood ratio (LLR) with respect to the first symbol through the $k^{th}$ symbol, respectively, each LLR calculated based on the received signal and channel information that is associated with the first node through the $k^{th}$ node, respectively.

The processing unit may generate the transmission signal in which LLRs of the selected symbols are equivalent to LLRs of the selected symbols in the received signal or are within a predetermined range.

The equivalence or the difference in the predetermined range may be determined based on the Kullback-Leibler distance.

The processing unit may estimate channels with respect to the first node through the $k^{th}$ node based on pilots that are transmitted from the first node through the $k^{th}$ node, respectively.

The relay node may further comprise a transmitting unit to transmit the transmission signal to a first destination node through a $k^{th}$ destination node corresponding to the first node through the $k^{th}$ node, respectively.

The transmitting unit may scale the transmission signal based on a predetermined transmission power, and transmit the scaled transmission signal.

The transmitting unit may transmit identification information that is associated with nodes corresponding to the selected symbols.

In another aspect, there is provided a relay node in a wireless network, the relay node including a receiver configured to receive symbols from one or more nodes that are within the wireless network, a processor configured to determine a reliability of each received symbol based on a physical layer network coding method that uses reliability, and a transmitter configured to transmit only those received symbols that are determined to have a reliability above a threshold.

The physical layer network coding method may calculate the reliability of a received symbol based on a log likelihood ratio (LLR) of the received symbol and channel information that is associated with a node that transmitted the received symbol.

The receiver may be further configured to simultaneously receive a first symbol from a first node and a second symbol from a second node, and the processor may be further configured to determine a reliability of the first symbol and the second symbol based on the physical layer network coding method that uses reliability.

In response to the receiver determining that the first symbol has a reliability above the threshold, and that the second symbol has a reliability below the threshold, the transmitter may be further configured to transmit a transmission signal including the first symbol and excluding the second symbol.

Other features and aspects may be apparent from the following detailed description, the drawings, and the claims.

Figure 1:
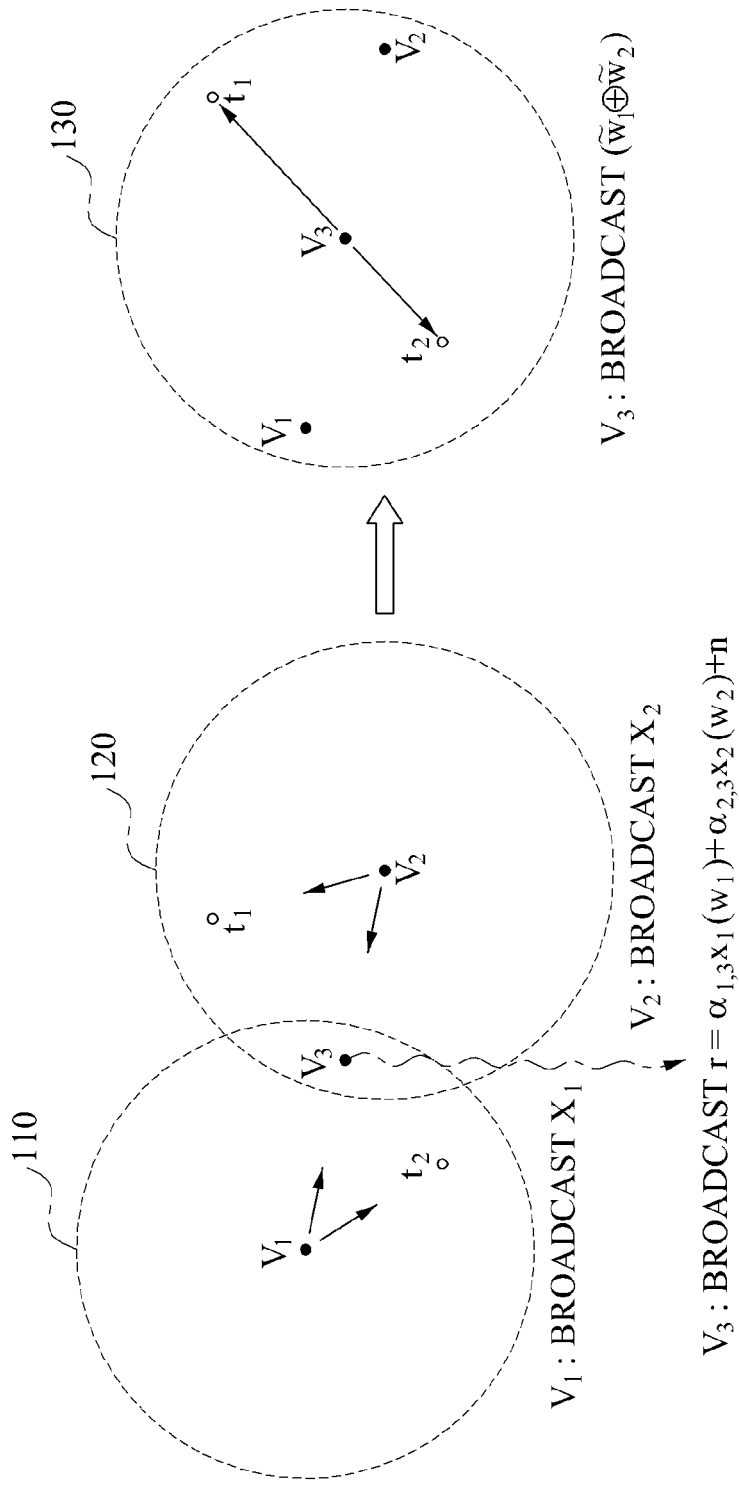
FIG. 1 is a diagram illustrating an example of an algebraic network coding scheme.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

A network error correcting method based on a physical layer network coding method may be used to correct errors that occur between communication links when a network coding scheme is used in a wireless ad hoc network environment. The network error correcting method that uses the physical layer network coding method may be applied without a significant change regardless of whether a number of nodes increases or decreases, and may be applicable to a wireless sensor network environment.

FIG. 1 illustrates an example of an algebraic network coding scheme.

Referring to FIG. 1, node $V_1$ is to transmit data $X_1$ to node $t_1$, and node $V_2$ is to transmit data $X_2$ to node $t_2$. In this example, node $t_1$ is located outside a coverage area 110 of node $V_1$, and node $t_2$ is located outside a coverage area 120 of node $V_2$. Accordingly, node $V_1$ and node $V_2$ may transmit data to node $t_1$ and node $t_2$, respectively, via a relay node $V_3$.

The algebraic network coding scheme may be a packet level network coding scheme. For example, node $V_1$ and node $V_2$ may transmit signal $X_1(w_1)$ and signal $X_2(w_2)$ to node $V_3$, respectively. In this example, node $V_1$ and node $V_2$ may stagger the transmission of signal $X_1$ and signal $X_2$. Relay node $V_3$ may decode a received signal to obtain data $\tilde{w}_1$ and data $\tilde{w}_2$, and may apply the network coding scheme to data $\tilde{w}_1$ and data $\tilde{w}_2$ to generate a transmission signal $\tilde{w}_1 \oplus \tilde{w}_2$. Relay node $V_3$ may broadcast the transmission signal.

Node $t_1$ and node $t_2$ are located inside a coverage area 130 of node $V_3$ and may receive the transmission signal of the relay node $V_3$. Accordingly, node t1 may obtain signal $X_1$ by network decoding signal $X_2$ that is received from node $V_2$ and the transmission signal from relay node $V_3$. In the same manner, node $t_2$ may obtain data $X_2$ by network decoding signal $X_1$ that is received from node $V_1$ and the transmission signal from relay node $V_3$.

In the algebraic network coding scheme, a relay node decodes each of signals that are received from transmission nodes, and thus, the relay node has a high complexity. Also, the algebraic network coding scheme may be vulnerable to interference from other transmission nodes.

Figure 2:
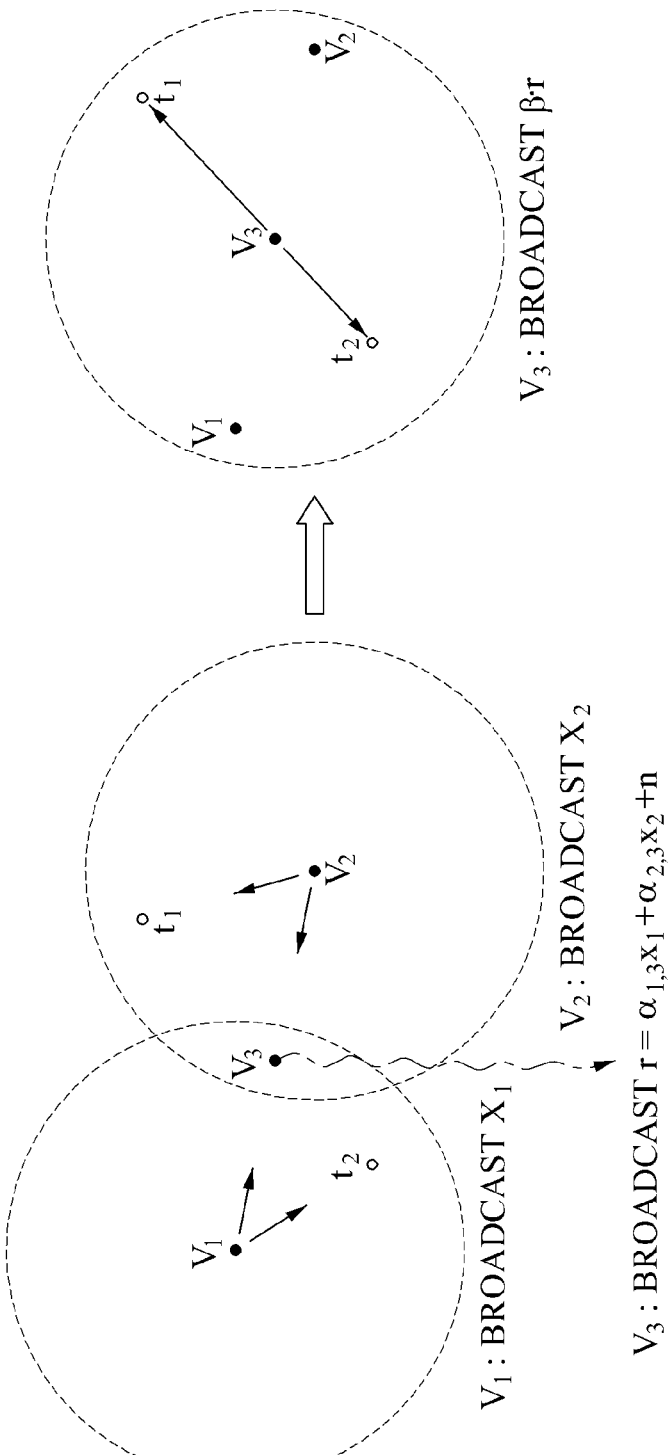
FIG. 2 is a diagram illustrating an example of an analog network coding scheme.

FIG. 2 illustrates an example of an analog network coding scheme.

Referring to FIG. 2, similar to FIG. 1, node $V_1$ is to transmit signal $X_1$ to node $t_1$, and node $V_2$ is to transmit signal $X_2$ to node $t_2$. In this example, node $V_1$ and node $V_2$ transmit data to node $t_1$ and node $t_2$, via relay node $V_3$.

In the analog network coding scheme, node $V_1$ may transmit signal $X_1$ to relay node $V_3$, and simultaneously, node $V_2$ may transmit signal $X_2$ to relay node $V_3$. Relay node $V_3$ may amplify a received signal including signal $X_1$ and signal $X_2$ to broadcast a generated transmission signal, without decoding the received signal.

Node $t_1$ may obtain signal $X_1$ based on signal $X_2$ that is received from node $V_2$ and the transmission signal from relay node $V_3$, and node $t_2$ may obtain signal $X_2$ based on signal $X_1$ that is received from node $V_1$ and the transmission signal from relay node $V_3$.

In the analog network coding scheme, a relay node may merely amplify and transmit a received signal, which also amplifies noise. Accordingly, a destination node may be significantly affected by noise.

Therefore, there is a need for a physical layer network coding method that is robust and scalable to overcome a drawback of the conventional network coding scheme. In various examples herein, a relay node may generate a transmission signal by removing a component that has a low reliability from a received signal, and may broadcast the generated transmission signal.

Various scenarios are provided as examples in the following. For example, node $V_j$ receives packets $P_{1,j}, P_{2,j}, \ldots, P_{k,j}$ from transmission nodes $V_i$ (i=1, 2, ..., k). Each transmission node $V_i$ may use a transmission power P. In this example, the packet $P_{i,j}$ is encoded as l constellation symbols $X_{i,j}^1 X_{i,j}^2 \ldots X_{i,j}^l$. A signal received by node $V_j$ is $Y_j^1 Y_j^2 \ldots Y_j^l$.

A received packet $Y_j^m$ (m=1, 2, ..., l) may be modeled as a corrupted version of a scaled versions of $X_{i,j}^m$ by $n_j^m$ that are independent identically distributed (i.i.d.) samples of additive noise $n_j$ that have a mean of zero and a variance of $\sigma^2$ per complex dimension. $Y_j^m$ may be expressed by equation $$Y_j^m = \sum_{i=1}^{k} \alpha_{i,j} X_{i,j}^m + n_j^m$$

(m=1, 2, ..., and l).

In this equation, $\alpha_{i,j}$ denotes a channel coefficient of channel between node $V_i$ to relay node $V_j$.

In the conventional network coding scheme, symbols $X_{i,j}^1 X_{i,j}^2 \ldots X_{i,j}^l$ (i=1, 2, ..., k) may be selected from the same lattice L. The selected lattice may be an integer lattice $Z^1$ or may be another lattice that has higher shaping gains. Relay node $V_j$ may calculate $\tilde{Y}_j^m = \sum_{i=1}^{k} b_i X_{i,j}^m$ (m=1, 2, ..., l) and a coefficient $(b_1, \ldots, b_k)$, based on the received packet $Y_j^m$. In this example, the coefficient $(b_1, \ldots, b_k)$ may be an integer vector. Relay node $V_j$ may transmit a transmission signal $\tilde{Y}_j^1 \tilde{Y}_j^2 \ldots \tilde{Y}_j^l$.

To generate the transmission signal $\tilde{Y}_j^1 \tilde{Y}_j^2 \ldots \tilde{Y}_j^l$, relay node $V_j$ may select a factor $\lambda$. The factor $\lambda$ may be a factor that enables $(\lambda \alpha_{1,j}, \lambda \alpha_{2,j}, \ldots, \lambda \alpha_{k,j})$ to be as close to a point $(b_1, \ldots, b_k)$ of the integer lattice $Z^k$. If the point $(b_1, \ldots, b_k)$ is a point closest to the integer lattice $Z^k$ to $(\lambda \alpha_{1,j}, \lambda \alpha_{2,j}, \ldots, \lambda \alpha_{k,j})$, a signal-to-noise ratio (SNR) of the transmission signal of relay node $V_j$ may be represented by $$SNR = \frac{P}{\lambda^2 + \sum_{i=1}^{k} P|\lambda \alpha_{i,j} - b_j|^2}.$$

Therefore, the factor $\lambda$ that increases the SNR the most may be determined.

The conventional schemes assume that receiver nodes are informed of a channel coefficient $\alpha_{i,j}$. However, if a relay node $V_j$ is not completely aware of the channel coefficient $\alpha_{i,j}$ and a high $\alpha_{i,j}$ is requested, an actual SNR of the transmission signal $\tilde{Y}_j^1 \tilde{Y}_j^2 \ldots \tilde{Y}_j^l$ may be lowered. According to the conventional schemes, performance may be based on $\alpha_{i,j}$ when the receiver nodes are not completely aware of the channel coefficient $\alpha_{i,j}$.

Therefore, a robust physical layer network coding method may be requested. A wireless sensor network that has a large change in topology based on access of member nodes may have robustness, scalability, and locality. Therefore, there is a need for a physical layer network coding method in which each node does not need a large amount of information associated with a network topology, an algorithm does not need to be significantly changed based on a change in a number of nodes, and in which performance is high.

Various examples herein are directed towards a physical layer network coding method that enhances the robustness by removing components of signals that have low reliabilities at each node. Hereinafter, an example of the physical layer network coding method is described with reference to a system model of FIG. 3.

Figure 3:
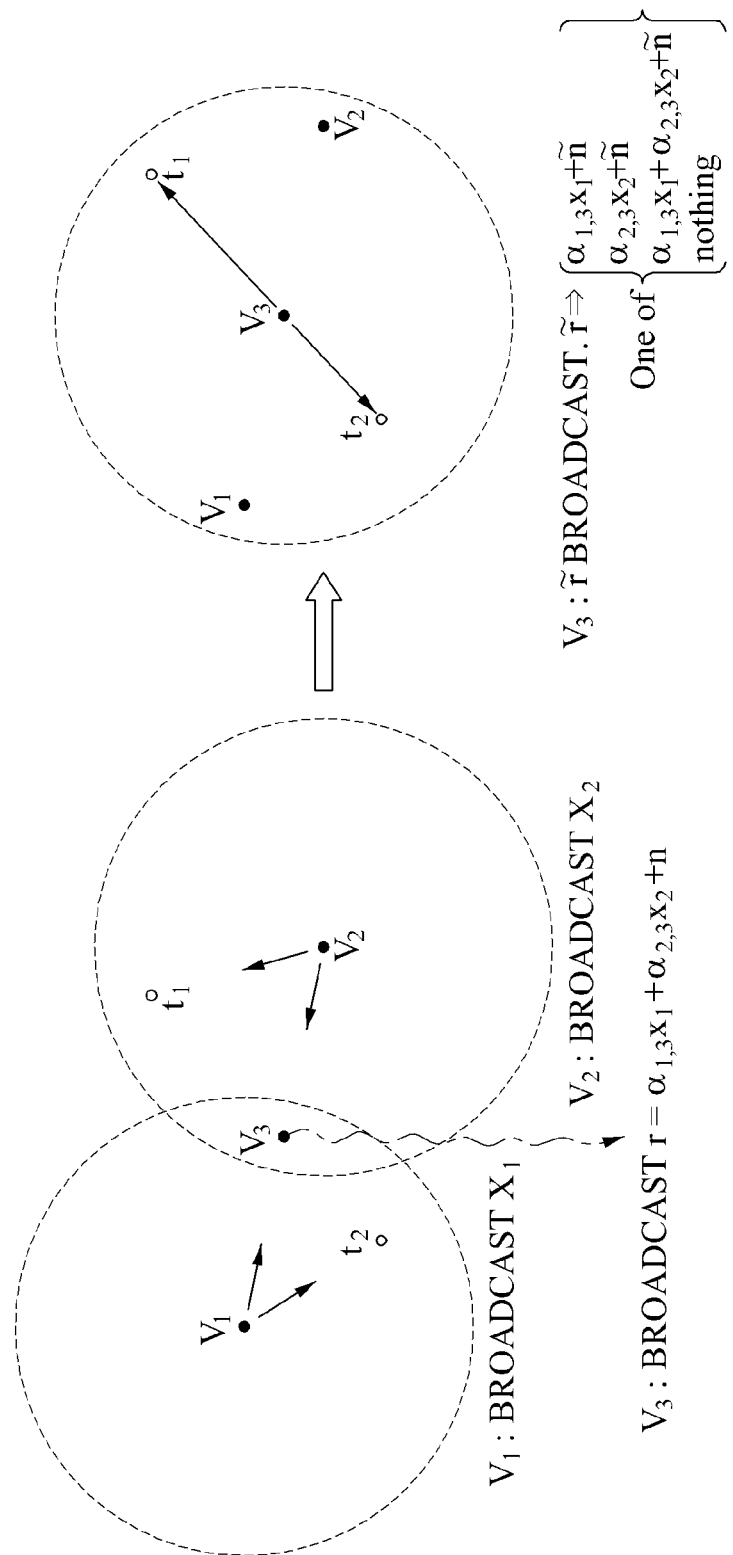
FIG. 3 is a diagram illustrating an example of a physical layer network coding method that uses reliability.

FIG. 3 illustrates an example of a physical layer network coding method that uses reliability.

Referring to FIG. 3, node $V_1$ transmits a bit $b_1$ based on a binary phase shift keying (BPSK) modulation scheme, and simultaneously, node $V_2$ transmits a bit $b_2$ based on the BPSK modulation scheme. In this example, node $V_3$ corresponds to a relay node. Node $V_3$ may simultaneously receive signals that are transmitted from node $V_1$ and node $V_2$. In this example, it is assumed that a channel between nodes is a complex Gaussian channel. A channel coefficient of a channel between node $V_1$ and node $V_3$, and a channel coefficient of a channel between node $V_2$ and node $V_3$ are $\alpha_{1,3}$ and $\alpha_{2,3}$, respectively. The received signal r at node $V_3$ may be modeled as shown below:

$$r = \alpha_{1,3} x_1 + \alpha_{2,3} x_2 + n$$

In this example, $x_i (-1)^{b_i}$ for i=1,2 and n denotes noise. In this example, n has a mean of zero and a variance of $\sigma^2/2$ per real dimension.

In this example, a log likelihood ratio ($b_1$) (LLR ($b_1$)) is greater than a predetermined threshold and an LLR ($b_2$) is not. Here, LLR (b)=ln {p(b=0|r)/p(b=1|r)}. Also in this example, the bit $b_1$ transmitted from node $V_1$ is greater than a predetermined criterion, and the bit $b_2$ transmitted from node $V_2$ is less than the predetermined criterion.

Node $V_3$ may generate a transmission signal ($\tilde{r}$) as expressed by $$\tilde{r} = \alpha_{1,3} x_1 + \tilde{n}$$

In this example, $\tilde{n}$ is an additive white Gaussian noise (AWGN) that has a mean of zero and a variance of $\sigma^2$ per real dimension. Also, $\sigma^2$ is a value to be optimized.

In this example, $\tilde{r}$ may be generated to have a distribution of an LLR that is approximately the same as the LLR ($b_1$), based on the Kullback-Leibler distance. Also, $\tilde{r}$ may be generated to include minimum noise. Accordingly, $\tilde{r}$ may be generated to minimize or otherwise reduce an expected power of error. $\tilde{r}$ may be generated to decrease the expected power of error and to remove an effect of the bit $b_2$ of which a reliability is lowered by Gaussian noise.

The physical layer network coding method may consume power for transmitting a bit that has a high reliability, as opposed to transmitting a bit that has a low reliability, and thus, may improve performance in transmission.

Hereinafter, an example of a method of node $V_3$ that generates $\tilde{r}$ is described. If a signal transmitted from node $V_1$ has a high reliability, and a signal transmitted from node $V_2$ has a low reliability, node $V_3$ may generate $\tilde{r}$ as given in Equation 1. As another example, if the signal from node $V_1$ has a low reliability and a signal from node $V_2$ has a high reliability, the transmission signal $\tilde{r}$ generated by node $V_3$ may be $\alpha_{2,3} x + \tilde{n}$. If both the signal from node $V_1$ and the signal from node $V_2$ have high reliabilities, $\tilde{r}$ generated by node $V_3$ may be $\alpha_{1,3} x + \alpha_{2,3} x + \tilde{n}$. If both the signal from node $V_1$ and the signal from node $V_2$ have low reliabilities, node $V_3$ may not generate $\tilde{r}$.

$$\tilde{r} = \alpha_{1,3} x + \tilde{n} \qquad \text{[Equation 1]}$$

In Equation 1, x is selected from signal constellation $A1=\{c1, c2, \ldots, crl\}$ and $\tilde{n}$ is an AWGN having a mean of zero and a variance of $\sigma^2$ per complex dimension.

Assuming that $p_i(=p(x_i=c_i|r)) \neq p(x=c_i|\tilde{r})$ with respect to all $i=1, 2, \ldots, r_1$, an expected power of error may be expressed by Equation 2.

$$\sum_{i=1}^{r_i} p_i |\tilde{r} - c_i|^2 \qquad \text{[Equation 2]}$$

Node $V_3$ may generate $\tilde{r}$ that minimizes the expected power of error.

For example, assuming that $d_i=|\tilde{r}-c_i|$, $i=1, 2, \ldots, r_1$, Equation 3 may be obtained without loss of generality by re-labeling.

$$p_1 \geq p_2 \geq p_3 \geq \ldots \geq p_{r_1} \qquad \text{[Equation 3]}$$

Equation 4 may be obtained by assuming that noise $\tilde{n}$ is the Gaussian model.

$$\frac{p_1}{p_i} = \frac{\exp\left(-\frac{d_1^2}{\sigma_2^2}\right)}{\exp\left(-\frac{d_i^2}{\sigma_2^2}\right)} \qquad \text{[Equation 4]}$$

(for $i=1, 2, \ldots, r_1$)

In this example, $$\ln(p_1) - \ln(p_i) + \frac{d_1^2}{\sigma_2^2} = \frac{d_i^2}{\sigma_2^2}$$

may be obtained by modifying Equation 4, and Equation 5 may be obtained by modifying Equation 2 that is associated with the expected power of error.

$$\frac{1}{\sigma_2^2} \sum_{i=1}^{r_i} p_i |\tilde{r} - c_i|^2 = \frac{d_1^2}{\sigma_2^2} + \log(p_1) - \sum_{i=1}^{r_1} p_i \ln(p_i) \qquad \text{[Equation 5]}$$

Assuming that $H(\mathcal{P}) = -\sum_{i=1}^{r_1} p_i \ln(p_i)$ is a natural entropy of a distribution $p_i$, Equation 5 may be modified to Equation 6.

$$\frac{1}{\sigma_2^2} \sum_{i=1}^{r_i} p_i |\tilde{r} - c_i|^2 = \frac{d_1^2}{\sigma_2^2} + \log(p_1) + H(\mathcal{P}) \qquad \text{[Equation 6]}$$

In this example, if $p_j$ is substituted for $p_1$, Equation 7 may be obtained with respect to an optimal $\tilde{r}$.

$$\frac{d_j^2}{\sigma_2^2} + \log(p_j) + H(\mathcal{P}) = K_o \qquad \text{[Equation 7]}$$

(for all $J=1, 2, \ldots r_1$)

In Equation 7, $K_o$ denotes a constant. Accordingly, $K_o$ and $\sigma^2$ that minimize Equation 8 representing the expected power may be selected.

$$\sum_{i=1}^{r_i} p_i |r - c_i|^2 = d_1^2 + \sigma_2^2 (\ln(p_1) + H(\mathcal{P})) \qquad \text{[Equation 8]}$$

For simplicity, assuming that $$a_j = \ln(p_j) + H(\mathcal{P}), \frac{d_j^2}{\sigma_2^2} + a_j = K_o.$$

<Scheme for a Constellation Having Two Elements>

A method of calculating an optimal $\tilde{r}$ when signal constellation A1 has two elements, namely, when $r_1=2$, is described.

First, an objective function such as the expected power of error $d_1^2 + \sigma_2^2 (\ln(p_1) + H(P))$, may be minimized with respect to a fixed $\sigma 2$ by decreasing $d_1$. When $d_1$ decreases based on Equation 7, $d_2$ may also decrease. However, $d_1 + d_2 \geq |c_1 - c_2|$, based on a triangle inequality.

Therefore, $d_1$ and $d_2$ that minimize the expected power of error with respect to the fixed $\sigma 2$ may be obtained by Equation 9.

$$d_1 d_2 = |c_1 - c_2| \qquad \text{[Equation 9]}$$

When $d=|c_1-c_2|$, Equation 10 may be obtained from $$\frac{d_j^2}{\sigma_2^2} + a_j = K_o.$$

$$d_2^2 - d_1^2 = \sigma_2^2 (a_1 - a_2) \qquad \text{[Equation 10]}$$

Therefore, a difference between $d_2$ and $d_1$ may be given by Equation 11.

$$d_2 - d_1 = \frac{\sigma_2^2 (a_1 - a_2)}{d_1 + d_2} = \frac{\sigma_2^2 (a_1 - a_2)}{d} \qquad \text{[Equation 11]}$$

$d_2$ and $d_1$ may be expressed by Equation 12.

$$d_1 = \frac{d}{2} - \frac{\sigma_2^2 (a_1 - a_2)}{2d}, \qquad \text{[Equation 12]}$$
$$d_2 = \frac{d}{2} + \frac{\sigma_2^2 (a_1 - a_2)}{2d}.$$

The expected power of error may be expressed by Equation 13, based on Equation 12.

$$d_1^2 + a_1 \sigma_2^2 = \left(\frac{d}{2} - \frac{\sigma_2^2 (a_1 - a_2)}{2d}\right)^2 + a_1 \sigma_2^2 \qquad \text{[Equation 13]}$$

When Equation 13 is differentiated with respect to $\sigma_2^2$, $\sigma_2^2$ that minimizes the expected power of error may be obtained as expressed by Equation 14.

$$\sigma_2^2 = -\frac{a_1 + a_2}{(a_1 - a_2)^2} d^2 \qquad \text{[Equation 14]}$$

In this example, $d_1$ and $d_2$ may be expressed by Equation 15, based on Equation 14.

$$d_1 = \frac{a_1}{a_1 - a_2} d,$$
$$d_2 = \frac{-a_2}{a_1 - a_2} d. \quad \text{[Equation 15]}$$

Equation 15 may be simplified as given in Equation 16.

$$d_1 = p_2 d$$
$$d_2 = p_1 d \quad \text{[Equation 16]}$$

The optimal $\tilde{r}$ may be expressed by Equation 17.

$$\tilde{r} = p_1 c_1 + p_2 c_2 \quad \text{[Equation 17]}$$

<Scheme for a Constellation Having Two or More Elements>

For a given $p_i (= p(xi = ci|r))$, $i = 1, 2, \ldots, r_1$, a value for $\tilde{r}$ that always satisfies Equation 18 may not exist.

$$p_i = p(x = c_i | \tilde{r}), i = 1, 2, \ldots, r_1 \quad \text{[Equation 18]}$$

When $\tilde{r}$ that satisfies Equation 18 exist, Equation 19 may be satisfied for all $i \neq j$.

$$\ln(p_i) - \ln(p_j) = -\frac{d_j^2}{\sigma_2^2} + \frac{d_i^2}{\sigma_2^2} \quad \text{[Equation 19]}$$

The equations in Equation 19 may correspond to lines that are perpendicular to a line segment between $c_i$ and $c_j$.

The lines may not always meet at the same $\tilde{r}$. If the lines meet at the same $\tilde{r}$, $p_i$ ($i = 1, 2, \ldots, r1$) may be a geometrically consistent probability distribution function (PDF).

In this example, complete matching may be difficult, and thus, there is a need for an $\tilde{r}$ that enables an a posteriori PDF, that is, $p(x = ci|\tilde{r})$ to be as close to $p_i$ based on the Kullback-Leibler distance, and that minimizes the expected power of error corresponding to $\Sigma_{i=1}^{r_i} P_i | \tilde{r} - c_i |^2$.

The a posteriori PDF induced by $\tilde{r}$ may be expressed by Equation 20.

$$Q(c_i) = p(c_i | \tilde{r}) = \frac{\exp\left(-\frac{d_i^2}{\sigma_2^2}\right)}{\sum_{j=1}^{r_i} \exp\left(-\frac{d_j^2}{\sigma_2^2}\right)} \quad \text{[Equation 20]}$$

The Kullback-Leibler distance between a distribution P and an a posteriori distribution may be expressed by Equation 21.

$$D(\mathcal{P}\|Q) = -H(\mathcal{P}) + \frac{1}{\sigma_2^2} \sum_{j=1}^{r_i} p_j d_j^2 + \ln\left(\sum_{j=1}^{r_i} \exp\left(-\frac{d_j^2}{\sigma_2^2}\right)\right) \quad \text{[Equation 21]}$$

In this example, $\Sigma_{j=1}^{r_i} p_j d_j^2$ is the expected power of error. At a high SNR, the approximation may be based on Equation 22.

$$\ln\left(\sum_{j=1}^{r_i} \exp\left(-\frac{d_j^2}{\sigma_2^2}\right)\right) \simeq \frac{-\min_j (d_j^2)}{\sigma_2^2} = \frac{-d_1^2}{\sigma_2^2} \quad \text{[Equation 22]}$$

Therefore, Equation 21 may be modified as Equation 23.

$$D(\mathcal{P}\|Q) \simeq -H(\mathcal{P}) + \frac{1}{\sigma_2^2} \left\{ \left( \sum_{j=1}^{r_i} p_j d_j^2 \right) - d_1^2 \right\}. \quad \text{[Equation 23]}$$

At a high SNR, a correct $\tilde{r}$ and a most adjacent point to the correct $\tilde{r}$ may have non-negligible posterior probabilities $p_1$ and $p_2$. In this example, $d_1^2 \cong p_2^2 d_2$ as described herein, and thus, the minimization of the Kullback-Leibler distance may be equivalent to the minimization of the expected power of error corresponding to $\Sigma_{j=1}^{r_i} p_j d_j^2$. Therefore, $\tilde{r}$ may be determined as expressed by Equation 24.

$$\tilde{r} = \sum_{i=1}^{r_1} p_i c_i. \quad \text{[Equation 24]}$$

Various examples are further provided herein. A first example describes BPSK transmission by two source nodes $V_1 = S_1$ and $V_2 = S_2$, and reception by an intermediate node $V_3$. A second example describes a case in which a higher order constellation and three or more transmission nodes exist. A third example describes transmission from arbitrary nodes, for example, relay nodes or source nodes, to arbitrary nodes.

<BPSK Transmission Example>

Node $V_3$ corresponding to a relay node receives source packets $P_{1,3}$ and $P_{2,3}$ from node $V_i$ ($i = 1, 2$) at an average transmission power P per node. In this example, packet Pi,j is encoded as l constellation symbols as shown in Equation 25.

$$X_{i,3}{}^1 X_{i,3}{}^2 \ldots X_{i,3}{}^l \quad \text{[Equation 25]}$$

A signal received by node $V_3$ is expressed by Equation 26.

$$Y_3{}^1 Y_3{}^2 \ldots Y_3{}^l \quad \text{[Equation 26]}$$

The received signal $(Y_3{}^m)$ ($m = 1, 2, \ldots, l$) may be modeled as a corrupted version of a scaled version of $X_{i,j}{}^m$ by $n_3{}^m$. In this example, $n_3{}^m$ is an i.i.d. sample of complex additive noise that has a mean of zero and a variance of $\sigma^2/2$ per real dimension. $Y_3{}^m$ may be expressed by Equation 27.

$$Y_3^m = \sum_{i=1}^{2} \alpha_{i,3} X_{i,3}^m + n_3^m \quad \text{[Equation 27]}$$

(for $m = 1, 2, \ldots, l$)

In Equation 27, $\alpha_{i,3}$ is a channel coefficient of a channel from node $V_i$ ($i = 1, 2$) to the node $V_3$.

In various examples, a potentially coded signal may be used, and thus, node $V_3$ may perform symbol-by-symbol transmission to reduce a complexity of node $V_3$. Node $V_3$ may regard BPSK symbols $X_{i,3}{}^1 X_{i,3}{}^2 \ldots X_{i,3}{}^l$ ($i = 1, 2$) as uncoded symbols and may calculate LLRs of symbols $X_{i,3}{}^m$ ($i = 1, 2$) from $Y_j{}^m$ ($m = 1, 2, \ldots, l$). Node $V_3$ may also calculate an average function of the LLRs as expressed by Equation 28.

$$LLR_i = LLR(X_{i,3}^1 X_{i,3}^2 \ldots X_{i,3}^1) = \frac{\sum_{m=1}^{l} |LLR(X_{i,3}^m)|}{1}$$ [Equation 28]

Other functions may be applicable. However, an LLR that is obtained from transmission of a BPSK uncoded signal may show that the LLR may be closely related to an average virtual SNR of each symbol stream. Node $V_3$ may select thresholds ($T_3^1$ and $T_3^2$), in advance. In this example, $T_3^1$ and $T_3^2$ denote LLR qualities of data streams, appropriated for decoding, which are from node $V_1$ and node $V_2$, respectively.

On the assumptions set forth in the forgoing, three cases may be possible based on a reliability of $Y_3^m$ of node $V_3$.

Case 1: $LLR_1 > T_3^1$ and $LLR_2 < T_3^2$ or $LLR_1 < T_3^1$ and $LLR_2 > T_3^2$ Case 2: all $LLR_i > T_3^1$ for i=1, 2

Case 3: all $LLR_i \le T_3^i$ for i=1, 2

Case 1 describes an example in which $LLR_1 > T_3^1$ and $LLR_2 < T_3^2$ without loss of generality.

In this example, node $V_3$ may generate a transmission signal ($\tilde{Y}_3^m$) (m=1, 2, ..., l) that has that $p(X_{1,3}^m | \tilde{Y}_3^m)$ has the same a posteriori probability distribution as $p(X_{1,3}^m | Y_3^m)$, and that minimizes an expected power of error. A method of generating $\tilde{Y}_3^m$ has been previously described and is given in Equation 29.

$$\tilde{Y}_3^m = \alpha_{1,3} X_{1,3}^m + \tilde{n}_3^m$$ [Equation 29]

In this example, $\tilde{Y}_3^m$ may have the same LLR as $LLR_1$ with respect to $X_{1,3m}$, and thus, from a point of view of receiver node $t_1$, $\tilde{Y}_3^m$ may be equivalent to $X_{1,3}^m$ and $\tilde{Y}_3^m$ may not carry information that is associated with $X_{2,3}^m$. Node $V_3$ may scale $\tilde{Y}_3^1 \tilde{Y}_3^2 \ldots \tilde{Y}_3^l$ using a constant factor β so that a sequence $(\beta \tilde{Y}_3^m)$ (m=1, 2, ..., l) may have an average power P. Node $V_3$ may perform scaling to satisfy another predetermined power constraint, such as a peak power. Node $V_3$ may transmit $\beta \tilde{Y}_3^m$. In this example, the information that is associated with $X_{2,3}^m$ may be removed from a header of the transmitted sequence. That is, identification information associated with node $V_1$ corresponding to $X_{1,3}^m$ may be included in a header of $\beta \tilde{Y}_3^m$. Accordingly, information that is associated with transmission nodes corresponding to symbols that have high reliabilities may be included in a header of a sequence.

Case 2 describes an example in which $X_{i,3}^1 X_{i,3}^2 \ldots X_{i,3}^l$, i=1,2 have high reliabilities, respectively. Node $V_3$ may generate a transmission signal that satisfies a condition of Case 2 and minimizes an expected power of error. In this example, a set of four possible values of $\Sigma_{i=1}^2 \alpha_{i,3} X_{i,3}^m$, given by $A=\{\pm \alpha_{1,3} \pm \alpha_{2,3}\}$, may be used.

Here, $Y_3^m$ of node $V_3$ may be expressed by Equation 30.

$$Y_3^m = X_3^m + n_3^m \ (m=1,2,\ldots,l)$$ [Equation 30]

Also, $X_3^m = \alpha_{1,3} X_{1,3}^m + \alpha_{2,3} X_{2,3}^m \in A$. Node $V_3$ may calculate $\tilde{Y}_3^m$ that has $p(X_3^m | \tilde{Y}_3^m)$ that has the same posterior distribution as $p(X_3^m | Y_3^m)$ based on the Kullback-Leibler distance, and that minimizes an expected power of error with respect to all m=1, 2, ..., l.

$$\tilde{Y}_3^m = X_3^m + \tilde{n}_3^m$$ [Equation 31]

The method of generating $\tilde{Y}_3^m$ has previously been described herein. Node $V_3$ may scale $\tilde{Y}_3^1 \tilde{Y}_3^2 \ldots \tilde{Y}_3^l$ using a constant factor β so that $\beta \tilde{Y}_3^m$ (m=1, 2, ..., l) may have an average power P. Also, the scaling may be performed to satisfy another predetermined power constraint, such as a peak power. Node $V_3$ may transmit $\beta \tilde{Y}_3^m$. That is, information that is associated with transmission nodes corresponding to symbols that have high reliabilities may be included in a sequence header. Accordingly, information that is associated with all the nodes in Case 2 may be included in a header of $\beta \tilde{Y}_3^m$.

Case 3 describes an example in which $X_{i,3}^1 X_{i,3}^2 \ldots X_{i,3}^l$, i=1,2 have reliabilities that are less than or equal to a predetermined criterion, respectively. Accordingly, node $V_3$ may not transmit a stream that is associated with $X_{i,3}^1 X_{i,3}^2 \ldots X_{i,3}^l$, i=1,2. Any further amplification or re-transmission may decrease a quality of an underlying stream in a transmission signal. Accordingly, node $V_3$ may cease transmission and may consume energy.

<Transmission Method for a Higher Order Constellation>

The descriptions herein may be extended to a case in which underlying signals use a higher order constellation, for example, quadrature phase-shift keying (QPSK), 8-phase-shift keying (PSK), and 16-Quadrature Amplitude Modulation (16-QAM). In this example, signal constellations in node $V_1 = S_1$ and node $V_2 = S_2$ are referred to as $A_1$ and $A_2$, respectively. A received signal ($Y_3^m$) of node $V_3$ may be expressed by Equation 32.

$$Y_3^m = \sum_{i=1}^{2} \alpha_{i,3} X_{i,3}^m + n_3^m$$ [Equation 32]

(m=1, 2, ..., l)

In Equation 32, $\alpha_{i,3}$ is a channel coefficient of a channel between node $V_i$ (i=1, 2) and node $V_3$.

For each of i=1, 2, m=1, 2, ..., l and $c \in A_i$, an LLR may be calculated as expressed by Equation 33.

$$LLR_{i,m}(c) = \ln \frac{p(X_{i,3}^m = c | r)}{p(X_{i,3}^m \ne c | r)}$$ [Equation 33]

In this example, $$LLR(X_{i,3}^m) = \max_{c \in A_i} LLR_{i,m}(c)$$

(i=1, 2, m=1, 2, ..., l).

Node $V_3$ may calculate an average LLR as expressed by Equation 34.

$$LLR_i = LLR(X_{i,3}^1 X_{i,3}^2 \ldots X_{i,3}^1) = \frac{\sum_{m=1}^{l} LLR(X_{i,3}^m)}{1}$$ [Equation 34]

In this example, node $V_3$ may select thresholds ($T_3^1$ and $T_3^2$) in advance. $T_3^1$ and $T_3^2$ denote LLR qualities of data streams from node $V_1$ and node $V_2$.

Based on the assumptions set forth herein, three cases may be possible based on a reliability of $Y_3^m$ of node $V_3$.

Case 1: $LLR1 > T_3^1$ and $LLR2 < T_3^2$ or $LLR1 < T_3^1$ and $LLR2 > T_3^2$

Case 2: all $LLRi > T_3^1$ for i=1, 2

Case 3: all $LLRi \le T_3^i$ for i=1, 2

In Case 3, node $V_3$ may not perform transmission in the same manner as the BPSK case.

Case 1 describes an example in which LLR1>T31 and LLR2<T32 without loss of generality. In this example, node $V_3$ may generate a transmission signal ($\tilde{Y}_3^m$) (m=1, 2, ..., l) that has $p(X_{1,3}^m|\tilde{Y}_3^m)$ that has the same a posteriori probability distribution as $p(X_{1,3}^m|Y_3^m)$, and that minimizes an expected power of error, as given in Equation 35. A method of generating $\hat{Y}_3^m$ has been described herein.

$$\tilde{Y}_3^m = \alpha_{1,3} X_{1,3}^m + \tilde{n}_3^m \quad \text{[Equation 35]}$$

In this example, $\hat{Y}_3^m$ may have the same LLR as LLR1 with respect to $X_{1,3m}$, and thus, from a point of view of receiver node $t_1$, $\hat{Y}_3^m$ may be equivalent to $X_{1,3}^m$ and $\hat{Y}_3^m$ may not carry information that is associated with $X_{2,3}^m$. Node $V_3$ may scale $\hat{Y}_3^1 \hat{Y}_3^2 \ldots \hat{Y}_3^l$ using a constant factor $\beta$ so that a sequence ($\beta \hat{Y}_3^m$) (m=1, 2, ..., l) may have an average power P. Node $V_3$ may perform scaling to satisfy another predetermined power constraint, such as a peak power. Node $V_3$ may transmit $\beta \hat{Y}_3^m$. In this example, all information that is associated with $X_{2,3}^m$ may be removed from a header of $\beta \hat{Y}_3^m$. That is, identification information that is associated with node $V_1$ corresponding to $X_{1,3}^m$ may be included in the header of $\beta \hat{Y}_3^m$. Accordingly, information that is associated with transmission nodes corresponding to symbols that have high reliabilities may be included in a header of a sequence.

Case 2 describes an example in which all symbols have high reliabilities, respectively.

Here, a set of $r_1 r_2$ possible values of $\Sigma_{i=1}^2 \alpha_{i,3} X_{i,3}^m$, given by $A = \{\alpha_{1,3} c_1 + \alpha_{2,3} c_2 | c_1 \in A_1, c_2 \in A_2\}$, may be used. In this example, $Y_3^m$ of node $V_3$ may be expressed by Equation 36.

$$Y_3^m = X_3^m + n_3^m \, (m=1,2,\ldots,l) \quad \text{[Equation 36]}$$

Also, $X_3^m = \alpha_{1,3} X_{1,3}^m + \alpha_{2,3} X_{2,3}^m \in A$. Node $V_3$ may calculate $\tilde{Y}_3^m$ that has $p(X_3^m|\tilde{Y}_3^m)$ that has the same a posteriori distribution as $p(X_3^m|Y_3^m)$ based on the Kullback-Leibler distance, and that minimizes an expected power of error with respect to all m=1, 2, ..., l.

$$\tilde{Y}_3^m = X_3^m + \tilde{n}_3^m \quad \text{[Equation 37]}$$

Node $V_3$ may scale $\tilde{Y}_3^1 \tilde{Y}_3^2 \ldots \tilde{Y}_3^l$ using a constant factor $\beta$ so that $\beta \tilde{Y}_3^m$ (m=1, 2, ..., l) may have an average power P. Also, the scaling may be performed to satisfy another predetermined power constraint, such as a peak power. Node $V_3$ may transmit $\beta \tilde{Y}_3^m$. In this example, information that is associated with transmission nodes corresponding to symbols that have high reliabilities may be included in a sequence header. Accordingly, information that is associated with all the nodes in Case 2 may be included in a header $\beta \tilde{Y}_3^m$.

<Three or More Transmission Nodes>

The descriptions herein may be extended to a case in which three or more transmission nodes corresponding to source nodes perform transmission to a single relay node. Assuming that K transmission nodes exist, a signal constellation of a node $V_i = S_i$ (i=1, 2, ..., k) is referred to as $A_i$ (i=1, 2, ..., k). In this example, $A_i$, includes $r_i$ (i=1, 2, ..., k) elements. A received signal of node $V_j$ is expressed by Equation 38.

$$Y_j^m = \sum_{i=1}^k \alpha_{i,j} X_{i,j}^m + n_j^m \quad \text{[Equation 38]}$$

(m=1, 2, ..., l)

In Equation 38, $\alpha_{i,j}$ is a channel coefficient of a channel between node $V_i$ (i=1, 2, ..., k) and node $V_3$.

For each of i=1, 2, m=1, 2, ..., l and $c \in A_i$, an LLR may be calculated as expressed by Equation 39.

$$LLR_{i,m}(c) = \ln \frac{p(X_{i,j}^m = c | r)}{p(X_{i,j}^m \neq c | r)} \quad \text{[Equation 39]}$$

Here, $$LLR(X_{i,j}^m) = \max_{c \in A_i} LLR_{i,m}(c)$$

(i=1, 2, ..., k and m=1, 2, ..., l)

Node $V_j$ may calculate an average LLR as expressed by Equation 40.

$$LLR_i = LLR(X_{i,j}^1 X_{i,j}^2 \ldots X_{i,j}^l) = \frac{\sum_{m=1}^l LLR(X_{i,j}^m)}{l} \quad \text{[Equation 40]}$$

(for i=1, 2, ..., k)

In this example, node $V_j$ may select thresholds ($T_j^i$) (i=1, 2, ..., k), in advance. $T_j^i$ denotes LLR qualities of data streams, appropriate for decoding, which are from node $V_i$. Node $V_j$ may select all of the nodes satisfying $LLR_i > T_j^i$, that is, all of the nodes that have high reliabilities. If a node satisfying $LLR_i > T_j^i$ does not exist, node $V_j$ may determine that none of symbols in the stream $X_{i,j}^1 X_{i,j}^2 \ldots X_{i,j}^l$ (i=1, 2, k) have a high reliability and may not transmit a stream associated with $X_{i,j}^1 X_{i,j}^2 \ldots X_{i,j}^l$. Any further amplification or re-transmission may decrease a quality of underlying stream in a transmission signal. Accordingly, node $V_3$ may cease transmission and may consume energy.

In this example, $LLR_i > (i=1, 2, \ldots, k_1)$ and $LLR_i \leq T_j^i$ ($k_1 < i \leq k$), for $k_1$ satisfying $1 \leq k_1 \leq k$, without loss of generality. $A = A_1 \times A_2 \times \ldots \times A_{k_1}$ $r_1, r_2, \ldots r_k$ linear sums $$\mathcal{A}(\alpha_{i,j}, \ldots, \alpha_{k_1,j}) = \left\{ \sum_{i=1}^{k_1} \alpha_{i,j} a_i \,\middle|\, a_i \in A_i \right\}$$

are used. For each m=1, 2, ..., l, node $V_j$ may calculate Equation 41.

$$LLR_{i,m}(c) = \ln \frac{p\left(\sum_{i=1}^{k_1} \alpha_{i,j} X_{i,j}^m = c \,\middle|\, r\right)}{p\left(\sum_{i=1}^{k_1} \alpha_{i,j} X_{i,j}^m \neq c \,\middle|\, r\right)} \quad \text{[Equation 41]}$$

$$c \in \mathcal{A}(\alpha_{1,j}, \ldots, \alpha_{k_1,j})$$

Node $V_j$ may generate a transmission signal ($\tilde{Y}_j^m$) that is modeled as given in Equation 42.

$$\tilde{Y}_j^m = X + \tilde{n} \quad \text{[Equation 42]}$$

$X \in A$ is a signal that is transmitted from each transmission node. $\tilde{n}$ complex Gaussian noise that has a mean of zero and a variance of $\sigma^2$ per complex dimension. Node $V_j$ may generate $\tilde{Y}_j^m$ that has $p(X_j^m|\tilde{Y}_j^m)$ the same a posteriori probability distribution as $p(X_j^m|Y_j^m)$ based on the Kullback-Leibler distance, and that minimizes an expected power of error with respect to all m=1, 2, ..., l.

Node $V_j$ may scale $\tilde{Y}_j^1 \tilde{Y}_j^2 \ldots \tilde{Y}_j^l$ using a constant factor $\beta$ so that a sequence $(\beta \tilde{Y}_j^m)$ (m=1, 2, ..., l) may have an average power P. Also, the scaling may be performed to satisfy another predetermined power constraint, such as a peak power. Node $V_j$ may transmit the scaled sequence to receiver nodes. For example, node $V_j$ may transmit a scaled sequence to receiver nodes.

<Transmission from Arbitrary Nodes to Arbitrary Nodes>

A case in which node $V_i$ (i=1, 2, ..., k) is not necessarily a source node is described. A transmission signal transmitted from each node may have a structure including a linear sum of source signals and noise. The structure is true for nodes in a layer 0 of a network, that is, source nodes. It should also be appreciated that a transmission signal in a layer 1 may have the same structure.

In this example, it is inductively assumed that node $V_i$ (i=1, 2, ..., k) in a layer q (q>1) transmits a signal corresponding to a linear sum of source signals that are influenced by noise. A support of the signal transmitted by node $V_i$ is referred to as supp($v_i$). In this example, supp($v_i$) may be a set of all source nodes $S_1, S_2, \ldots, S_N$ that appear in the linear summation part of the signal transmitted by node $V_i$. Also, supp($v_j$, i=1, 2, ..., k)=$\cup_{i=1}^{k}$supp($V_i$). A signal at node $V_j$ may be a linear sum of signals of source nodes appear in supp($v_i$, i=1, 2, ..., k). In relation to node $V_j$, it is similar to a case in which sources nodes in $\cup_{i=1}^{k}$supp($v_i$) directly perform transmission to node $V_j$, with selected channel coefficients.

Accordingly, node $V_j$ may apply the network coding method described herein. Similarly, a signal transmitted from node $V_j$ may also be a signal corresponding to a linear sum of signals, influenced by noise, which are transmitted from source nodes. Accordingly, it is inductively verified that an arbitrary node may transmit a signal corresponding to a linear sum of source signals influenced by noise. Therefore, the physical layer network coding method may be applicable to an arbitrary network such as another relay node.

<Network Coding Header>

An example of a header for the network coding method is described. According to the physical layer network coding method, a header of a signal transmitted by node $V_j$ may include only information supp($v_j$). For example, the header may include indices of only source nodes included in the support.

In this example, pilot sequences that an intermediate node is aware of, in advance, may be included in respective packets that are transmitted from source nodes so that an intermediate node corresponding to a relay node or a receiver node corresponding to a destination node may estimate effective channel coefficients. The pilot sequences may not be regarded as overhead because the pilot sequences may be used for channel estimation in a communication system that does not use a network coding scheme.

<Decoding in Destination Node>

An example of a reception process in each destination node is described. Based on a transmission strategy of a prior layer, each destination node ($T_j$) (j=1, 2, ..., M) may receive $M_j$ linear sums of source packets that include noise, from $N_j \leq N$ source nodes $S_1, \ldots, S_N$. This process is similar to a wireless multi-user transmission that includes $N$, transmitters and $M_j$ reception antennas. This process is also similar to an $N_j \times M_j$ multiple-input multiple-output (MIMO) transmission scenario in which transmission antennas transmit independent coded signals. Therefore, various MIMO receivers, for example, a BLAST receiver, a full maximum likelihood receiver, and the like, may be applied to $T_j$ to decode source packets. For example, if $N_j = M_j$, a MIMO channel inversion may be applicable to separation of signals transmitted from various source nodes.

<Method of Enhancing Robustness and Scalability>

Each node may use a multilevel structure to determine a constellation to obtain more enhanced robustness and scalability. For example, a QPSK constellation may be a scaled sum of a BPSK constellation, as given by Equation 43.

$$QPSK = \frac{\sqrt{2}}{2} BPSK + \sqrt{-1} \frac{\sqrt{2}}{2} BPSK \quad \text{[Equation 43]}$$

A 16-QAM constellation may be given by Equation 44.

$$16\text{-}QAM = \frac{2}{\sqrt{5}} QPSK + \sqrt{-1} \frac{1}{\sqrt{5}} QPSK \quad \text{[Equation 44]}$$

In the same manner, 32-QAM, and 64-QAM may be expressed by scaled versions of BPSK and QPSK constellations. For example, a source node $S_i$ that performs transmission based on the 16-QAM constellation may be a sum of virtual sources $S_i^1$ and $S_i^2$ that transmits QPSK symbols at channel gains of $$\frac{2}{\sqrt{5}} \text{ and } \frac{1}{\sqrt{5}}.$$

Although one of the virtual sources transmits a signal that has a low reliability, the robustness may be enhanced because the other virtual source may transmit a signal.

Figure 4:
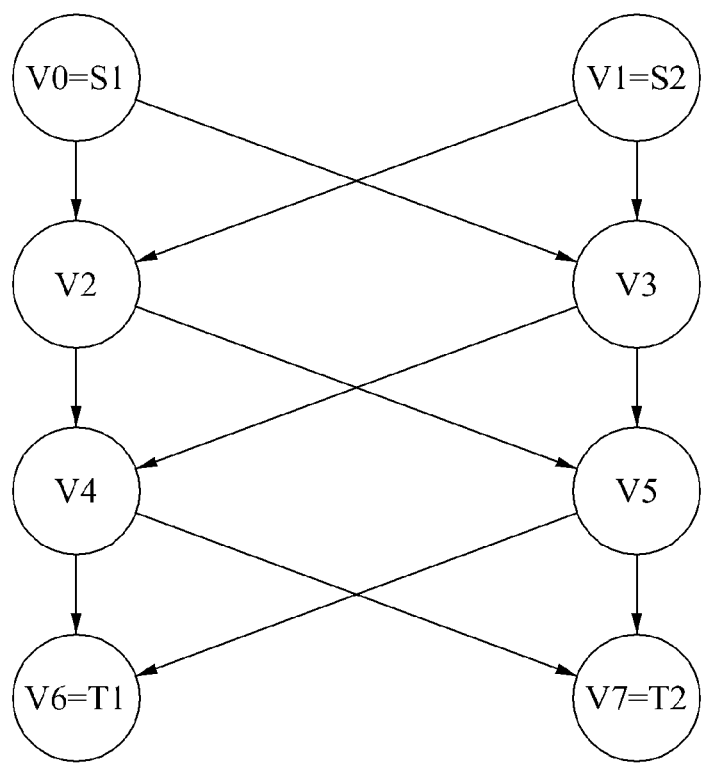
FIG. 4 is a diagram illustrating an example of a network to which a physical layer network coding method is applied.

FIG. 4 illustrates an example of a network to which a physical layer network coding method is applied.

Referring to FIG. 4, two source nodes $V_0 = S_1$ and $V_1 = S_2$ exist in a layer 0, two relay nodes $V_2$ and $V_3$ exist in a layer 1, nodes $V_4$ and $V_5$ exist in a layer 2, and destination nodes $V_6 = T_1$ and $V_7 = T_2$ exist in a layer 3.

A channel gain $\alpha_{i,j}$ between node $V_i$ in each layer k (k=0, 1) and node in a layer k+1 may be modeled as i.i.d. samples of a circularly symmetric complex Gaussian N(0,1) that have a variance of 0.5 per real dimension, with respect to all i and j. In this example, a received signal of node $V_j$ is corrupted by i.i.d. samples of a circularly symmetric complex Gaussian N(0, $\sigma_j^2$) that have a variance of $\sigma_j^2/2$ per real dimension. Also, an average transmission power for each transmission node is assumed to be 1. Accordingly, an SNR may be defined as $$1 \Big/ \sigma_2^2 \tfrac{1}{\sigma_2^2}.$$

The transmission from $V_0 = S_1$ and $V_1 = S_2$ may be simultaneously received by node $V_2$ and node $V_3$ which correspond to relay nodes, and transmission from node $V_2$ and node $V_3$ may be simultaneously received by node $V_4$ and node $V_5$ which correspond to relay nodes. Transmission from node $N_4$ and transmission from node $V_5$ may be performed at different times, and may be separately received by nodes $V_6 = T_1$ and $V_7 = T_2$ corresponding to destination nodes. The source nodes may perform transmission using an uncoded QPSK. For simplicity, all thresholds for reliability are assumed to be zero.

Each receiver may perform maximum likelihood (ML) decoding. Hereinafter, results of simulation based on scenarios described herein are provided with reference to FIGS. 5 through 7.

Figure 5:
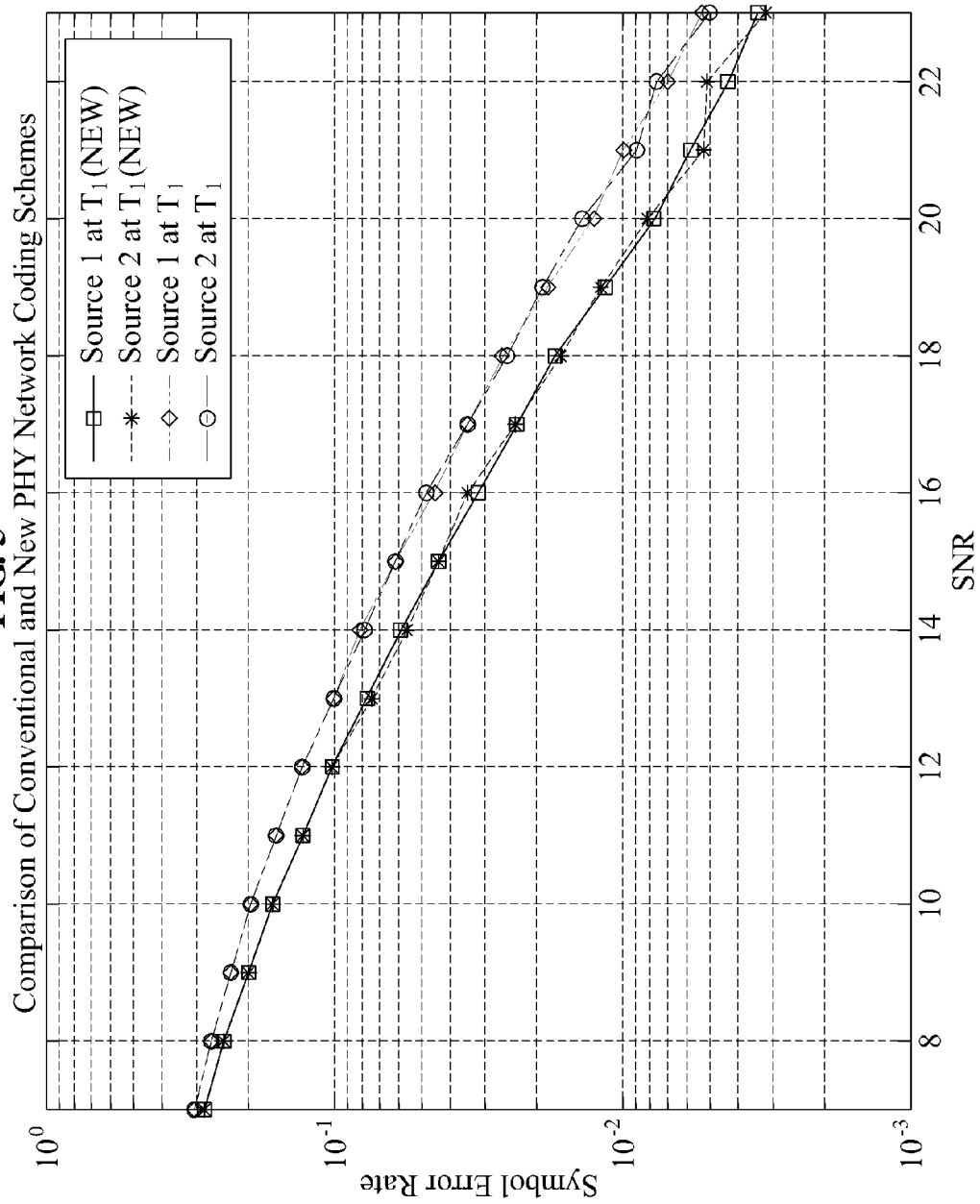
FIGS. 5 through 7 are graphs illustrating examples of a result of a simulation based on a physical layer network coding method that uses reliability.
Figure 6:
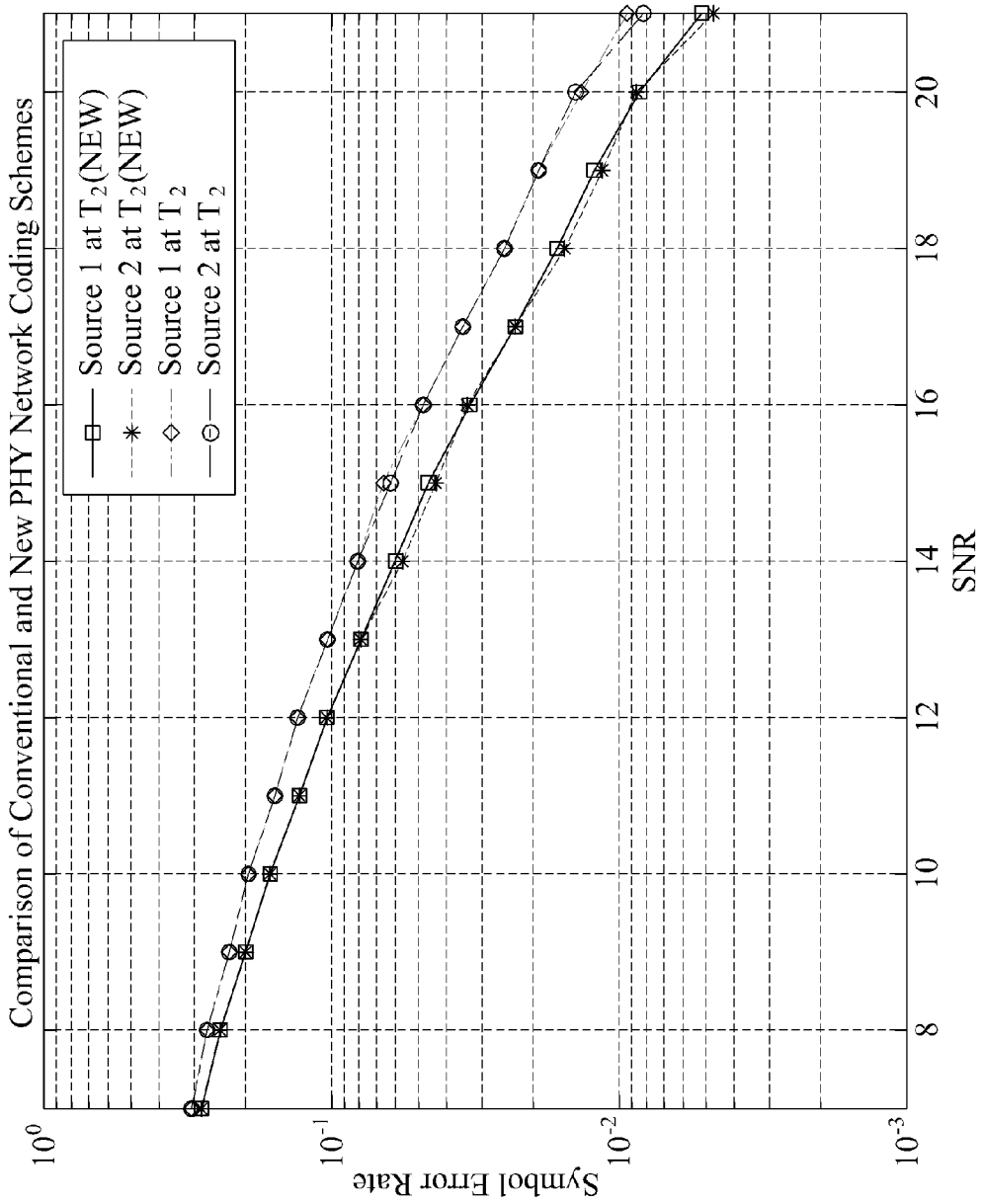
Figure 7:
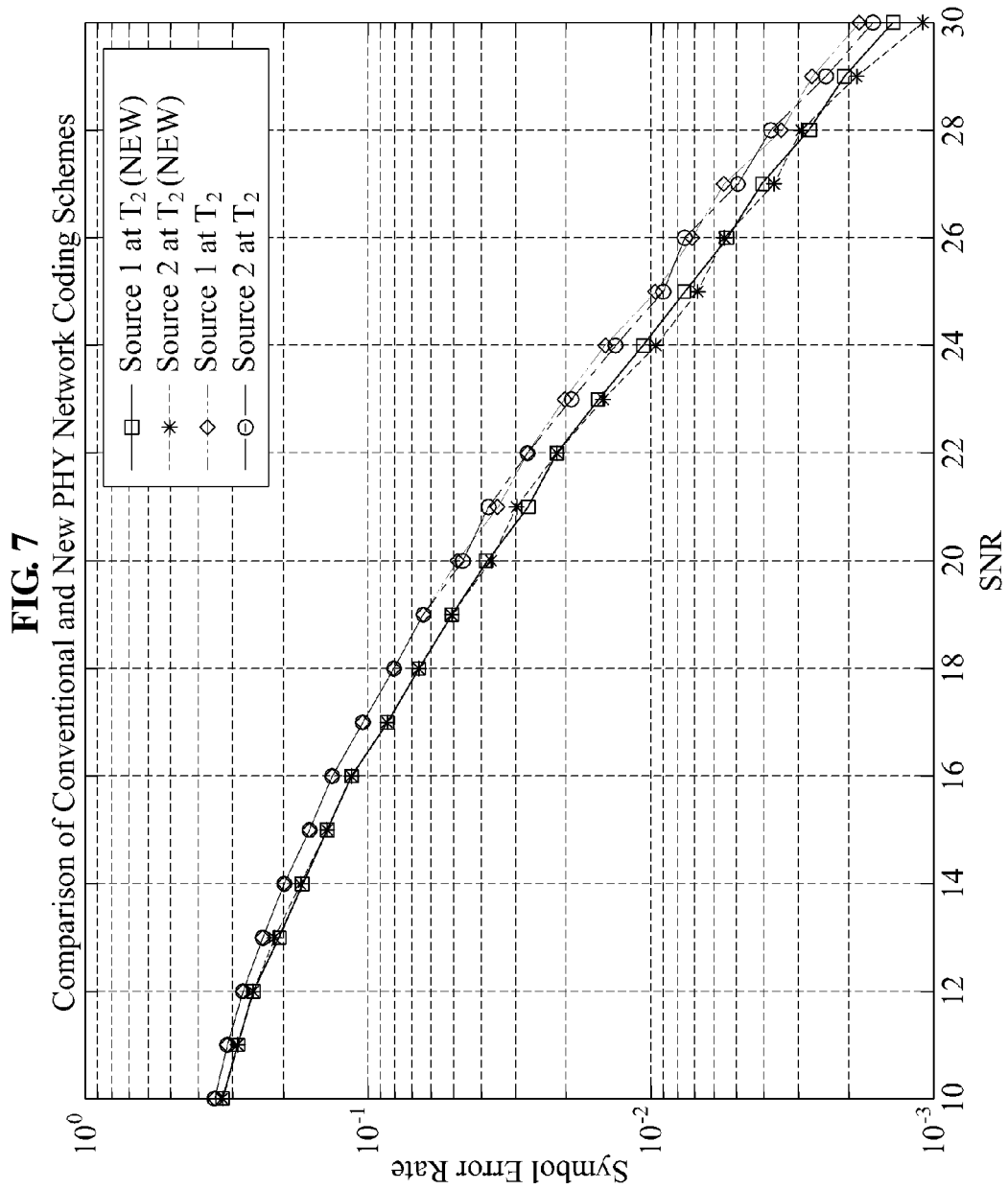

FIGS. 5 through 7 illustrate examples of a result of a simulation based on a physical layer network coding method that uses reliability.

FIGS. 5 and 6 illustrate a comparison between a result of a simulation with respect to $$\sigma_2^2 = \sigma_3^2 = 2\sigma_4^2 = 2\sigma_5^2 = 2\sigma_6^2 = 2\sigma_7^2$$

and a result based on a conventional analog-and-forward scheme. The physical layer network coding method that uses reliability may enhance performance by about 2 dB when compared to the conventional scheme. As can be seen, the SNR is improved in the physical network coding method that uses reliability.

FIG. 7 shows a result of a simulation with respect to $$2\sigma_2^2 = 2\sigma_3^2 = \sigma_4^2 = \sigma_5^2 = \sigma_6^2 = \sigma_7^2.$$

In this example, a gain may be enhanced by about 1 dB in FIG. 7 because an amount of noise to be controlled at a first stage is relatively small, unlike FIGS. 5 and 6.

The example simulation results from FIGS. 5 through 7 illustrate that the physical layer network coding method may enhance robustness and scalability in comparison to the conventional method. More enhanced simulation result may be obtained based on a network structure or a channel environment.

Figure 8:
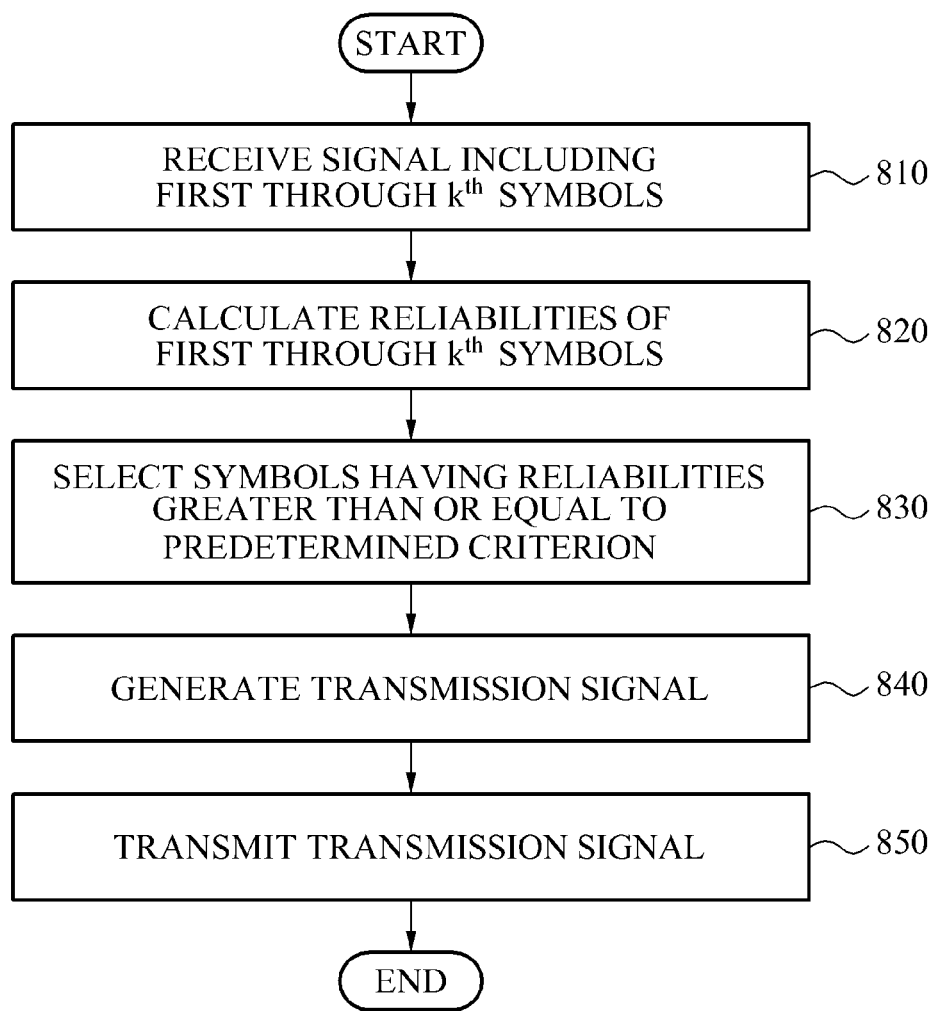
FIG. 8 is a flowchart illustrating an example of a communication method of a relay node based on a physical layer network coding method that uses reliability.

FIG. 8 illustrates an example a communication method of a relay node based on a physical layer network coding method that uses reliability.

Referring to FIG. 8, the relay node receives a signal that includes a first symbol through $k^{th}$ symbols that are transmitted from a first node through a $k^{th}$ node, that is, from transmission nodes in 810. For example, the relay node may estimate, in advance, channels with respect to the first node through the $k^{th}$ node respectively, based on pilots transmitted from the first node through the $k^{th}$ node.

The relay node respectively calculates the reliabilities of the first symbol through the $k^{th}$ symbol based on a predetermined criterion, in 820. For example, the relay node may calculate reliabilities of the first symbol through the $k^{th}$ symbol, based on corresponding LLRs of the first symbol through the $k^{th}$ symbol. Each LLR may be calculated based on the received signal and corresponding channel information that is associated with the first node through the $k^{th}$ node.

The relay node selects symbols that have reliabilities that are greater than or equal to the predetermined criterion from the first symbol through the $k^{th}$ symbol, in 830.

The relay node generates a transmission signal that maintains the reliabilities of selected symbols and that excludes components that are associated with symbols that have reliabilities that are less than the predetermined criterion, in 840. In this example, the relay node may generate the transmission signal to decrease an expected power of error between the transmission signal of the relay node and a signal corresponding to the received signal excluding noise. For example, the relay node may generate the transmission signal of which LLRs of the selected symbols that are equivalent to LLRs of the selected symbols in the received signal or that are different in a predetermined range. As an example, the equivalency or the difference may be determined based on the Kullback-Leibler distance, or may be based on a different standard.

In 850, a relay node transmits the transmission signal to receiver nodes, that is, a first destination node through a $k^{th}$ destination node that correspond to the first transmission node through the $k^{th}$ transmission node, in 850. The relay node may broadcast the transmission signal. The relay node may scale the transmission signal based on a predetermined transmission power and may transmit the scaled transmission signal. The relay node may transmit identification information that is associated with nodes corresponding to the selected symbols, that is, symbols that have high reliabilities.

Figure 9:
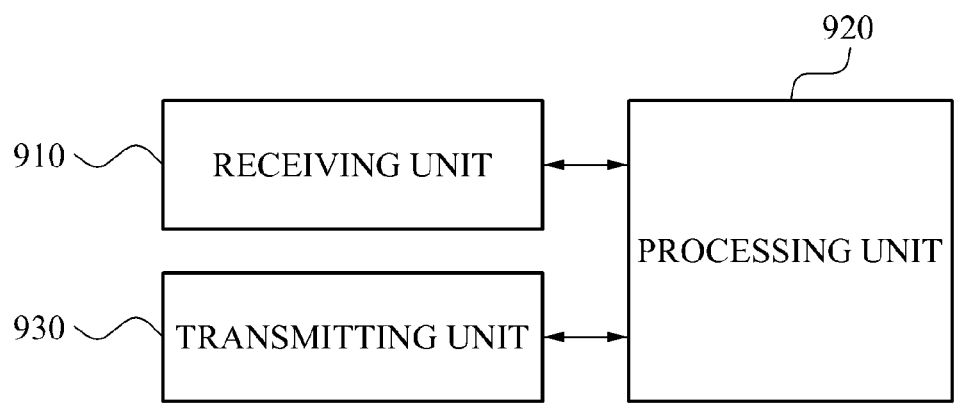
FIG. 9 is a diagram illustrating an example of a relay node that uses a physical layer network coding method that uses reliability.

FIG. 9 illustrates an example of a relay node that uses a physical layer network coding method that uses reliability.

Referring to FIG. 9, the relay node includes a receiving unit 910, a processing unit 920, and a transmitting unit 930.

The receiving unit 910 may receive a signal that includes a first symbol through a $k^{th}$ symbol that is transmitted from a first node through a $k^{th}$ node.

The processing unit 920 may calculate the reliabilities of the first symbol through the $k^{th}$ symbol, respectively, based on a predetermined criterion. The processing unit 920 may select symbols that have reliabilities that are greater than or equal to the predetermined criterion from the first symbol through the $k^{th}$ symbol. The processing unit 920 may generate, based on the received signal, a transmission signal that maintains the reliabilities of the selected symbols and that excludes components that are associated with symbols that have reliabilities that are less than the predetermined criterion.

The transmitting unit 930 may transmit the transmission signal.

A relay node and a communication method of the relay node have been previously described. That is, the examples described herein with reference to FIGS. 1 through 7 are also applicable to the relay node of FIG. 9 and the communication method of the relay node of FIG. 8, and thus, further descriptions thereof is omitted for conciseness.

Various examples are directed towards a relay node that determines the reliability of symbols corresponding to a plurality of nodes, based on a signal received from the plurality of nodes. The relay node may generate a transmission signal to maintain the reliability of symbols having high reliabilities and to exclude components of symbols that have low reliabilities. Accordingly, the relay node may reduce an amount of power consumed for transmitting symbols that have low reliabilities and may consume a greater amount of power for transmitting symbols that have high reliabilities. Accordingly, transmission efficiency may increase.

In various examples, the relay node may generate a transmission signal that reduces an expected power of error based on a signal that is received from a plurality of nodes, and thus, may reduce the effect of noise.

In various examples, a transmission signal generating method of a relay node may have a high scalability because the method may be performed regardless of a change in a number of nodes.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/node described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a relay node, the method comprising:
receiving a signal including a first symbol through a $k^{th}$ symbol that are transmitted from a first node through a $k^{th}$ node, respectively;
calculating, based on a predetermined criterion, a reliability of the first symbol through the $k^{th}$ symbol, respectively;
selecting one or more symbols from among the first through the $k^{th}$ symbol that have a reliability that is greater than or equal to the predetermined criterion; and
generating a transmission signal that maintains the reliabilities of the selected symbols and that excludes components of symbols that have reliabilities which are less than the predetermined criterion where k in reference to the $k^{th}$ node is an integer greater than one,
wherein the generating comprises generating the transmission signal to decrease an expected power of error between the transmission signal and the received signal by adjusting a variance of Gaussian noise comprised in the transmission signal.

2. The method of claim 1, wherein the calculating comprises:
calculating the reliabilities of the first symbol through the $k^{th}$ symbol, based on a log likelihood ratio (LLR) with respect to the first symbol through the $k^{th}$ symbol, respectively, each LLR calculated based on the received signal and channel information that is associated with the first node through the $k^{th}$ node, respectively.

3. The method of claim 1, wherein the generating comprises:
generating the transmission signal in which LLRs of the selected symbols are equivalent to LLRs of the selected symbols in the received signal or are within a predetermined range.

4. The method of claim 3, wherein the equivalence or the difference in the predetermined range is determined based on the Kullback-Leibler distance.

5. The method of claim 1, further comprising:
estimating channels with respect to the first node through the $k^{th}$ node based on pilots that are transmitted from the first node through the $k^{th}$ node, respectively.

6. The method of claim 1, further comprising:
transmitting the transmission signal to a first destination node through a $k^{th}$ destination node corresponding to the first node through the $k^{th}$ node, respectively.

7. The method of claim 6, wherein the transmitting comprises:
transmitting the transmission signal by scaling the transmission signal based on a predetermined transmission power.

8. The method of claim 1, further comprising:
transmitting identification information that is associated with nodes corresponding to the selected symbols.

9. A non-transitory computer-readable storage medium having stored therein program instructions to cause a processor to implement a communication method of a relay node, the method comprising:
receiving a signal including a first symbol through a $k^{th}$ symbol that are transmitted from a first node through a $k^{th}$ node, respectively;
calculating, based on a predetermined criterion, a reliability of the first symbol through the $k^{th}$ symbol, respectively;
selecting one or more symbols from among the first through the $k^{th}$ symbol that have a reliability that is greater than or equal to the predetermined criterion; and
generating a transmission signal that maintains the reliabilities of the selected symbols and that excludes components of symbols that have reliabilities which are less than the predetermined criterion where k in reference to the $k^{th}$ node is an integer greater than one, wherein the generating comprises generating the transmission signal to decrease an expected power of error between the transmission signal and the received signal by adjusting a variance of Gaussian noise comprised in the transmission signal.

10. A relay node comprising:
a receiving unit configured to receive a signal including a first symbol through a $k^{th}$ symbol that are transmitted from a first node through a $k^{th}$ node, respectively; and
a processing unit configured to calculate, based on a predetermined criterion, reliabilities of the first symbol through the $k^{th}$ symbol, respectively,
wherein the processing unit selects one or more symbols that have a reliability that is greater than or equal to the predetermined criterion from among the first symbol through the $k^{th}$ symbol, and generates a transmission signal that maintains the reliabilities of the selected symbols and that excludes components of symbols that have reliabilities which are less than the predetermined criterion where k in reference to the $k^{th}$ node is an integer greater than one,
wherein the processing unit generates the transmission signal to decrease an expected power of error between the transmission signal and the received signal by adjusting a variance of Gaussian noise comprised in the transmission signal.

11. The relay node of claim 10, wherein the processing unit calculates the reliabilities of the first symbol through the $k^{th}$ symbol, based on log likelihood ratio (LLR) with respect to the first symbol through the $k^{th}$ symbol, respectively, each LLR calculated based on the received signal and channel information that is associated with the first node through the $k^{th}$ node, respectively.

12. The relay node of claim 10, wherein the processing unit generates the transmission signal in which LLRs of the selected symbols are equivalent to LLRs of the selected symbols in the received signal or are within a predetermined range.

13. The relay node of claim 12, wherein the equivalence or the difference in the predetermined range is determined based on the Kullback-Leibler distance.

14. The relay node of claim 10, wherein the processing unit estimates channels with respect to the first node through the $k^{th}$ node based on pilots that are transmitted from the first node through the $k^{th}$ node, respectively.

15. The relay node of claim 10, further comprising:
a transmitting unit to transmit the transmission signal to a first destination node through a $k^{th}$ destination node corresponding to the first node through the $k^{th}$ node, respectively.

16. The relay node of claim 15, wherein the transmitting unit scales the transmission signal based on a predetermined transmission power, and transmits the scaled transmission signal.

17. The relay node of claim 10, wherein the transmitting unit transmits identification information that is associated with nodes corresponding to the selected symbols.

18. A relay node in a wireless network, the relay node comprising:
a receiver configured to receive symbols from one or more nodes that are within the wireless network;
a processor configured to determine a reliability of each received symbol based on a physical layer network coding method that uses reliability; and
a transmitter configured to transmit only those received components of symbols that are determined to have a reliability above a threshold,
wherein the processor is further configured to generate a transmission signal to decrease an expected power of error between the transmission signal and a received signal by adjusting a variance of Gaussian noise comprised in the transmission signal.

19. The relay node of claim 18, wherein the physical layer network coding method calculates the reliability of a received symbol based on a log likelihood ratio (LLR) of the received symbol and channel information that is associated with a node that transmitted the received symbol.

20. The relay node of claim 18, wherein the receiver is further configured to simultaneously receive a first symbol from a first node and a second symbol from a second node, and the processor is further configured to determine a reliability of the first symbol and the second symbol based on the physical layer network coding method that uses reliability.

21. The relay node of claim 20, wherein, in response to the receiver determining that the first symbol has a reliability above the threshold, and that the second symbol has a reliability below the threshold, the transmitter is further configured to transmit a transmission signal including the first symbol and excluding the second symbol.

* * * * *